(12) United States Patent
Liu

(10) Patent No.: US 9,078,472 B2
(45) Date of Patent: Jul. 14, 2015

(54) ELECTRONIC CIGARETTE DEVICE

(75) Inventor: Qiuming Liu, Shenzhen (CN)

(73) Assignee: HUIZHOU KIMREE TECHNOLOGY CO., LTD., SHENZHEN BRANCH, Shenzhen, Guangdong Province (CN)

( * ) Notice: Subject to any disclaimer, the term of this patent is extended or adjusted under 35 U.S.C. 154(b) by 261 days.

(21) Appl. No.: 13/703,018

(22) PCT Filed: Aug. 24, 2012

(86) PCT No.: PCT/CN2012/080549
§ 371 (c)(1),
(2), (4) Date: Dec. 8, 2012

(87) PCT Pub. No.: WO2014/029105
PCT Pub. Date: Feb. 27, 2014

(65) Prior Publication Data
US 2014/0053858 A1   Feb. 27, 2014

(51) Int. Cl.
*A24F 47/00* (2006.01)
*A24F 15/18* (2006.01)

(52) U.S. Cl.
CPC ............... *A24F 47/002* (2013.01); *A24F 15/18* (2013.01); *A24F 47/008* (2013.01)

(58) Field of Classification Search
USPC .................................................. 320/114–115
See application file for complete search history.

(56) References Cited

U.S. PATENT DOCUMENTS

| 4,489,268 | A | * | 12/1984 | Beachy | 320/106 |
| 5,095,259 | A | * | 3/1992 | Bailey et al. | 320/114 |
| 5,791,463 | A | * | 8/1998 | Negelen | 206/147 |
| 2010/0079107 | A1 | * | 4/2010 | Silverbrook | 320/115 |
| 2011/0089891 | A1 | * | 4/2011 | Pai | 320/107 |
| 2012/0199146 | A1 | * | 8/2012 | Marangos | 131/328 |
| 2012/0227753 | A1 | * | 9/2012 | Newton | 131/347 |
| 2013/0255702 | A1 | * | 10/2013 | Griffith et al. | 131/328 |
| 2013/0284194 | A1 | * | 10/2013 | Newton | 131/329 |

* cited by examiner

*Primary Examiner* — Richard Crispino
*Assistant Examiner* — Eric Yaary
(74) *Attorney, Agent, or Firm* — Cheng-Ju Chiang

(57) ABSTRACT

An electronic cigarette device includes electronic cigarette and a case for accommodating electronic cigarette. The case has a first magnetic part at a position coupled to electronic cigarette, the electronic cigarette correspondingly has a second magnetic part absorbing the first magnetic part to keep the electronic cigarette and the case firmly engaged. The case has a first connector at a position coupled to electronic cigarette, the first connector comprises a first socket, a first pole in center of the first socket, and first insulating bush inserted between the first socket and first pole. The electronic cigarette includes an inhaling shell and a power shell, the power shell has a battery therein, one end of the power shell has a second connector connected with a second battery and coupled to the first connector. The electronic cigarette device is convenient for placing electronic cigarette into the case or taking it out therefrom.

15 Claims, 7 Drawing Sheets

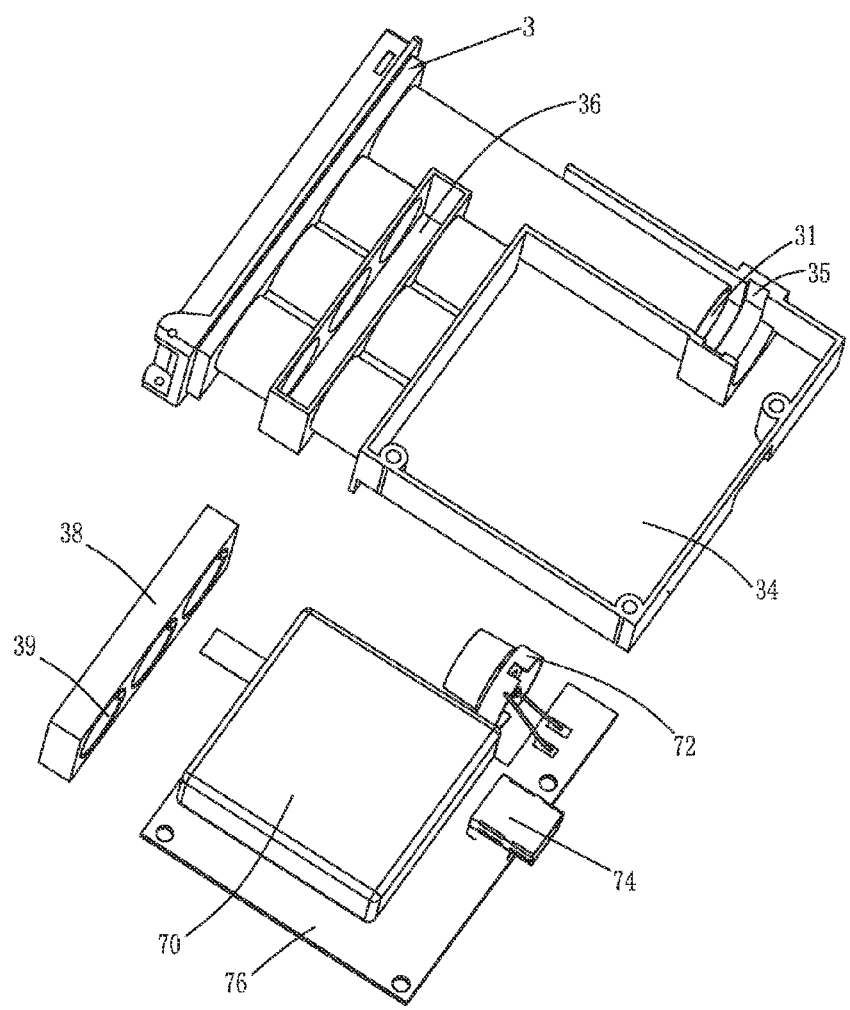
FIG. 4
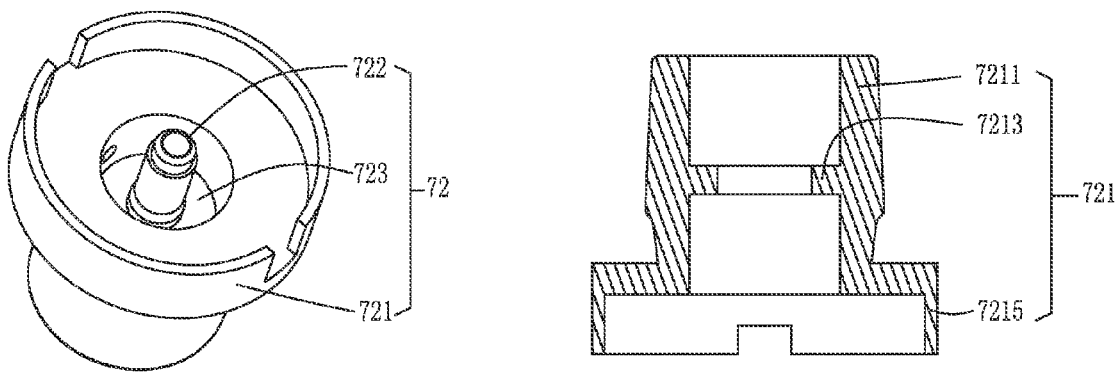
FIG. 5                    FIG. 6

ELECTRONIC CIGARETTE DEVICE

CROSS REFERENCE TO RELATED APPLICATIONS

The present application is a 35 U.S.C. §371 National Phase conversion of International (PCT) Patent Application No. PCT/CN2012/080549, filed on Aug. 24, 2012, the disclosure of which is incorporated by reference herein. The PCT International Patent Application was filed in Chinese.

FIELD OF THE INVENTION

The present invention relates to an electronic simulated cigarette, and especially to an electronic cigarette device.

BACKGROUND OF THE INVENTION

An electronic cigarette device usually includes electronic cigarette and a case for accommodating and charging the electronic cigarettes. Existing electronic cigarette includes an inhaling shell and a power shell, the inhaling shell and power shell are threadedly connected together; if the electronic cigarette is unused, the inhaling shell and the power shell are usually detached and then respectively placed in corresponding slots of the electronic cigarette case. The existing electronic cigarette case includes a main body, a frame disposed in the main body for holding the inhaling shell and power shell of the electronic cigarette, and a power assembly for charging the power shell. The power assembly includes a battery, PCB, and a first connector. The first connector is a cupper sleeve part with internal thread, and the power shell correspondingly has a second connector. When the power shell is placed in the corresponding slot of the electronic cigarette case, the second and first connectors are correspondingly coupled for charging. As for the existing electronic cigarette case, the second connector and the first connector are threadedly connected, such connecting way results inconveniently placing the power shell into corresponding slot or pulling it out away.

SUMMARY OF THE INVENTION

A main object of the present invention is to provide an electronic cigarette device, which is convenient for the electronic cigarette to be placed into or pulled out away from a case.

To obtain the above object, an electronic cigarette device of the present invention comprises an electronic cigarette and an electronic cigarette case for accommodating the electronic cigarette. Wherein, the electronic cigarette case has a first magnetic part at a position where is coupled to the electronic cigarette, and the electronic cigarette correspondingly has a second magnetic part to absorb the first magnetic part so that the electronic cigarette and the electronic cigarette case are firmly engaged together.

Furthermore, the electronic cigarette case has a first connector at a position where is coupled to the electronic cigarette. The first connector comprises a first socket, a first pole disposed in center of the first socket, and a first insulating bush inserted between the first socket and the first pole so as to isolate the first socket from the first pole.

Furthermore, the first socket may be made from conductive magnet or magnetic materials, and is configured as the first magnetic part; or the first connector is set with an independent structural member made from conductive magnet or magnetic materials as the first magnetic part.

Furthermore, the electronic cigarette case comprises a main body with an open top, a frame inside the main body for accommodating the electronic cigarette, a cover movably engaged on the open top of the main body, and a power assembly set on the frame.

Furthermore, the power assembly comprises the first connector, a first battery disposed in a battery groove at a bottom of the frame, a power port extending to an outer wall of the main body and connected with the first battery, and a PCB with a power charging control circuit therein and connected with the first battery; the first socket and the first pole of the first connector are electrically connected with the PCB by wires; and the first connector, the first battery and the power port are all integrated on the PCB.

Furthermore, the electronic cigarette comprises an inhaling shell and a power shell. The power shell as a whole is shaped as a cylinder; the power shell is set with a second battery therein, and one end of the power shell is set with a second connector which is connected with the second battery and is coupled to the first connector of the electronic cigarette case.

Furthermore, the second connector comprises a second socket, a second pole disposed in center of the second socket, and a second insulating bush inserted between the second socket and the second pole for spacing the second socket from the second pole. The second socket and the second pole are respectively connected with either anode or cathode of the second battery inside the power shell.

Furthermore, the second socket is made from conductive magnet or magnetic materials and is configured as the second magnetic part; or the second connector is set with an independent structural member made from conductive magnet or magnetic materials as the second magnetic part.

Furthermore, the second pole is inserted in the second insulating bush, a stop ring is formed on a section of the second pole within the second socket, and a spring is fitted on the section of the second pole within the second socket. Both ends of spring respectively abut against the stop ring and an inner end wall of the second socket so as to keep the second pole extending outwards.

Furthermore, the power shell has a joint sleeve at its end with the second connector. The second connector is disposed in an inner end of the joint sleeve, while the joint sleeve in its outer end defines a taper hole with a bigger front portion and a smaller rear portion, and the first socket of the first connector correspondingly has its front end configured as a cone with a smaller front portion and a bigger rear portion.

Furthermore, the inhaling shell and the power shell is detachably connected. The inhaling shell comprises an inhaling tube, an atomizer and a tobacco-liquid cup disposed in the inhaling tube, a mouthpiece cover disposed at one end of the inhaling tube, and a third connector disposed at the other end of the inhaling tube for being coupled to the second connector of the power shell. The third connector comprises a third socket, a third pole and a third insulating bush which is inserted between the third socket and the third pole for separating the third socket from the third pole. The third socket and the third pole are respectively connected with either electrode of the atomizer in the inhaling shell.

Furthermore, the third socket of the third connector is made from conductive magnet or magnetic materials and thereby is configured as a third magnetic part; or the third connector is set with an independent structural member as the third magnetic part which is made from conductive magnet or magnetic materials. The third magnetic part magnetically absorbs the third magnetic part of the power shell.

Furthermore, the inhaling shell and the power shell are detachably connected; and the frame at its top end defines a first slot and second slot for respectively accommodating the inhaling shell and the power shell of the electronic cigarette.

Furthermore, the frame defines a retaining nest disposed at bottom of the second slot, the first socket of the first connector forms a flange ring round its outer wall, and the first connector is mounted in retaining nest in the frame by virtue of the flange ring.

Furthermore, the frame defines a tensioning groove at a center of the first slot and crossing the first slots, a tensioner made from elastic material is mounted in the tensioning groove, and the tensioner defines a through-hole which is aligned to the first slot and has a slightly-smaller diameter than outer diameter of the inhaling shell so as to fasten the inhaling shell therein.

According to above technical proposals, the present invention has following advantages:

when the electronic cigarette is placed in the electronic cigarette case, the electronic cigarette and the electronic cigarette case can be simply and firmly connected by virtue of magnetic absorption between the first magnetic part and the second magnetic part, such connection manner is simple and convenient for operation.

An embodiment of the present invention taken in conjunction with the accompanying drawings is described in detail as follows.

BRIEF DESCRIPTION OF THE DRAWINGS

FIG. 4 is an exploded, perspective view of a frame and a power assembly of the electronic cigarette case in accordance with the embodiment of the invention.

FIG. 5 is a perspective view of a first connector in the electronic cigarette case in accordance with the embodiment of the invention.

FIG. 6 is a cross-sectional view of a first socket of the first connector in accordance with the embodiment of the invention.

DETAILED DESCRIPTION OF THE INVENTION

Figure 1:
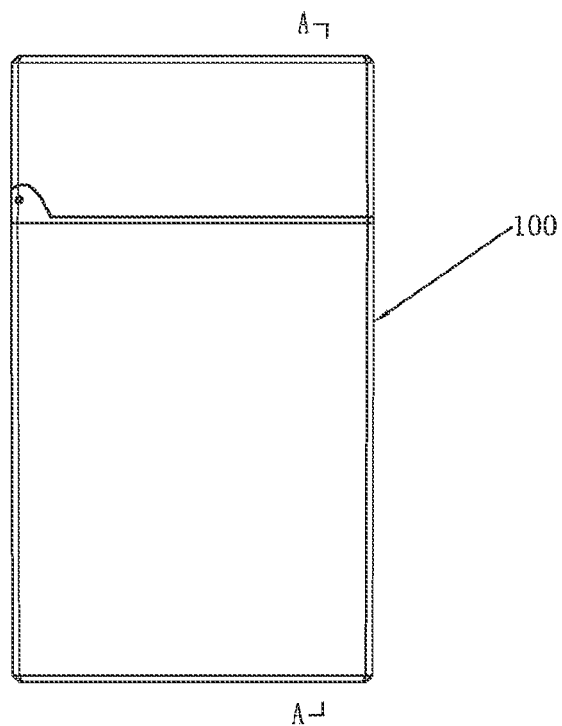
FIG. 1 is a front plan view of an electronic cigarette device in accordance with an embodiment of the invention.

As shown in FIGS 1 to 11, an embodiment of the present invention provides an electronic cigarette device, which comprises an electronic cigarette 200 and an electronic cigarette case 100 for accommodating and charging the electronic cigarette 200.

As shown in FIGS. 1 to 4, the electronic cigarette case 100 comprises a main body 1 with an opening 10 at its top end, a frame 3 set in the main body 1, a cover 5 movably set at the opening 10 of the main body 1 for covering the opening 10, and a power assembly 7 disposed on the frame 3 in the main body 1. The electronic cigarette 200 comprises an inhaling shell 20 and a power shell 26 both of which is detachably engaged. If the electronic cigarette is not used, the inhaling shell 20 and the power shell 26 can be detached and respectively placed to the frame 3 in the main body 1; while the electronic cigarette will be used, the inhaling shell 20 and the power shell 26 are respectively taken from the frame 3 and are connected together for use. When the power shell 26 is placed in the frame 3, it can be electronically connected with the power assembly 7 for charging.

Figure 2:
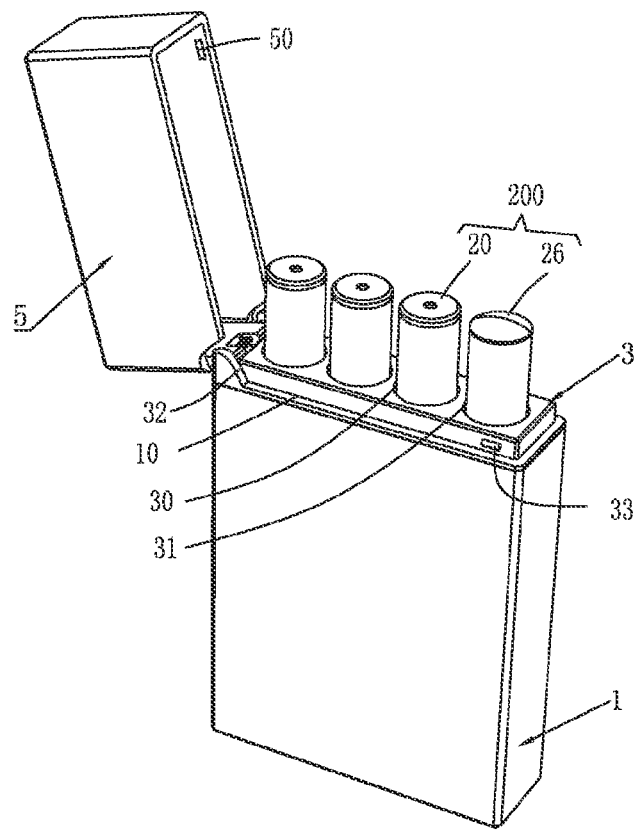
FIG. 2 is a perspective view of the electronic cigarette device with a cover of the electronic cigarette case open in accordance with the embodiment of the invention.
Figure 3:
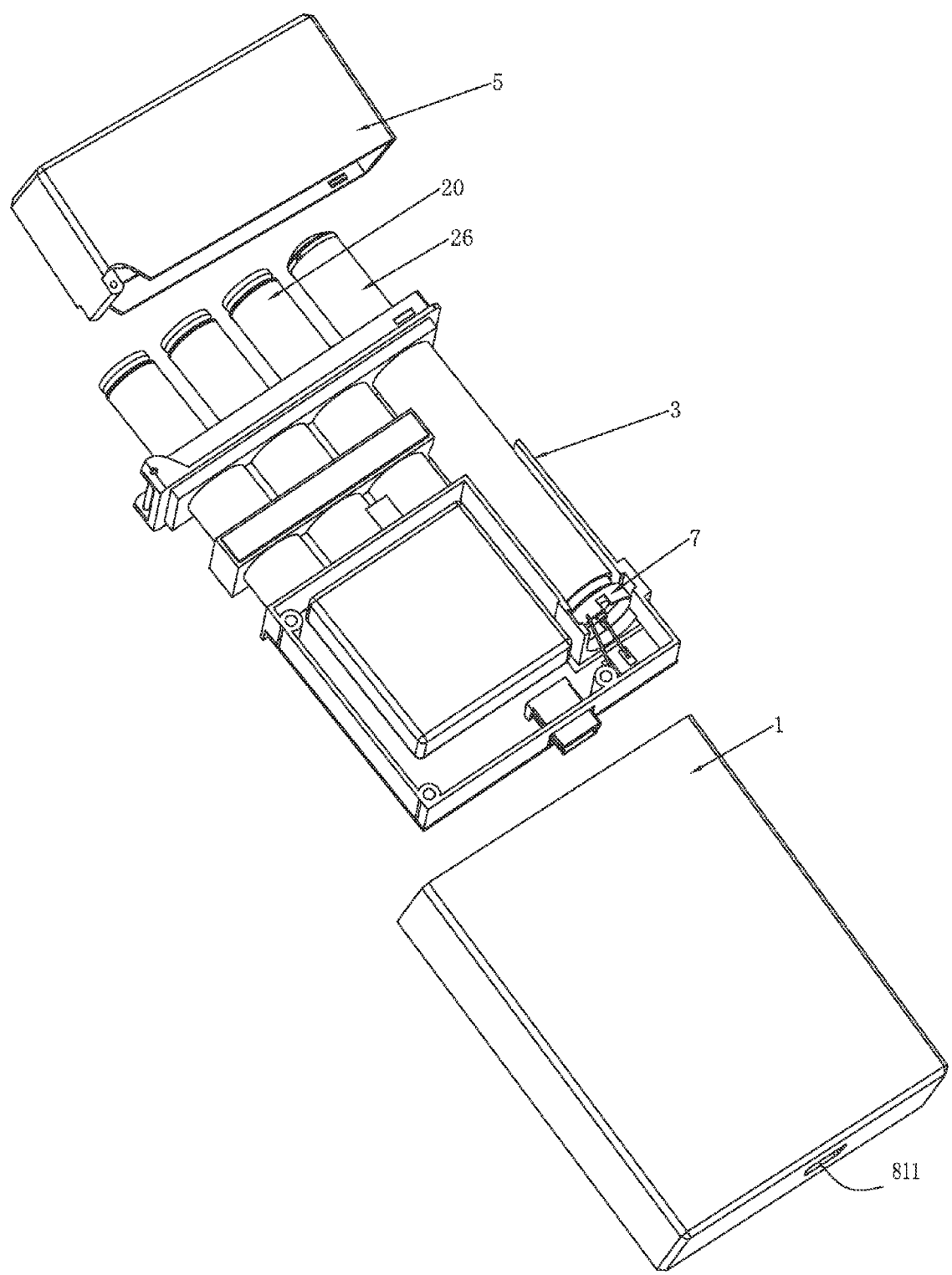
FIG. 3 is an exploded, perspective view of the electronic cigarette device in accordance with the embodiment of the invention.

The main body 1 is shaped about a cuboid as usual cigarette case, and of course can be shaped as a cylinder, an elliptical cylinder, an polygonal cylinder, or other various designs. The frame 3 at its top defines a first slot 30 and a second slot 31 for respectively holding the inhaling shell 20 and the power shell 26 of the electronic cigarette. As shown in FIGS. 2-4, the electronic cigarette case 100 in accordance with the embodiment has received three inhaling shells 20 and one power shell 26, and the frame 3 accordingly defines three first slots 30 and one second slot 31. The frame 3 is inserted in the main body 1, as shown in FIGS. 2-4, a top of the frame 3 can extend from the opening 10 of the main body 1 and forms a flange 32 overlapping a top edge of the opening 10. The frame 3 defines a battery cavity 34 and a retaining nest 35 positioned at bottom of the second slot 31 for accommodating the power shell 26. The frame 3 defines a tensioning groove 36 at center of the first slot 30 and crossing the first slots 30, a tensioner 38 made from elastic material is mounted in the tensioning groove 36, the tensioner 38 defines through-holes 39 aligned to the first slots 30 and with a slightly smaller diameter than outer diameter of the inhaling shell 20, and when the inhaling shell 20 passes through the through-holes 39, it will be elastically grasped.

The cover 5 is adapted to the main body 1, as shown in FIGS. 2-3, in accordance with the embodiment, one end of the cover 5 is hinged to one side of the frame 3, while the other end of the cover 5 and the corresponding side of the frame 3 are set with a snap-fit mechanism for locking Specifically, the cover 5 forms recesses 50, and the frame 3 forms projections 33 engaged with the recesses 50. A lock operation is quickly performed by virtue of the projections 33 being held in the recesses 50, and the lock is removed if the projections 33 are separated from the recesses 50, thereby, not only such structure is simple, but also operation is convenient. It is understood, the cover 5 may be directly hinged to the main body 1. The projections 33 maybe formed on the edge of the opening 10 of the main body 1. Otherwise, positions of the projections 30 and the recesses 50 can be exchanged. The main body 1, the frame 3 and the cover 5 are preferably made from plastic by injection molding, and can be made from metals as well.

As shown in FIGS. 3-4, the power assembly 7 comprises a first battery 70 placed in the battery cavity 34 in a bottom portion of the frame 3, a first connector 72 which is connected with the first battery 70 and supplies a connection for a second connector 27 of the power shell 26, a power port 74 extending to an outer wall of the main body 1 and connecting with the first battery 70, and a PCB 76 which has a charging control circuit and is connected with the first battery 70. Preferably, the main body forms an insertion hole 811 at its bottom for the power port 74 extending outwards and connecting with an external power source for recharging the first battery 70. The power port 74 is preferably a USB port. The first battery 70, the first connector 72 and the power port 74 can all be integrated on the PCB 76 so as to modularly manufacture and assemble.

As shown in FIGS. 4-8, the first connector 72 which is disposed at a bottom end of the second slot 31, comprises a first socket 721 as the first electrode, a first pole 722 as the second electrode which is located at center of the first socket 721, and a first insulating bush 723 disposed between the first socket 721 and the first pole 722. The first socket 721 and the first pole 722 are electrically insulated by the insulating bush 723, and both the first socket 721 and the first pole 722 are electrically connected with the PCB 76 by wires. The first socket 721 in a shape about a cylinder, defines a communicating hole 7211 therein. Inner wall of the communicating hole 7211 forms a circumferential clasp 7213. The first socket 721 is embedded in the retaining nest 35 in the frame 3. For effectively positioning the first socket 721 in the retaining nest 35, outer wall of the first socket 721 forms a flange ring 7215, and the flange ring 7215 is gripped in the retaining nest 35 (as shown in FIG. 3). The first insulating bush 723 is shaped as a cylinder, and is hollow in center. Outer wall of the insulating bush 723 forms a recess 7230 which engages the circumferential clasp 7213 in the communicating hole 7211 of the socket 721 so as to fix the first insulating bush 723 in the socket 721. The first pole 722 is about cylindrical structure, and its outer wall forms a positioning groove 7220 for being engaged with the hollow center of the first insulating bush 723 so as to fix the first pole 722 in the first insulating bush 723.

Figure 8:
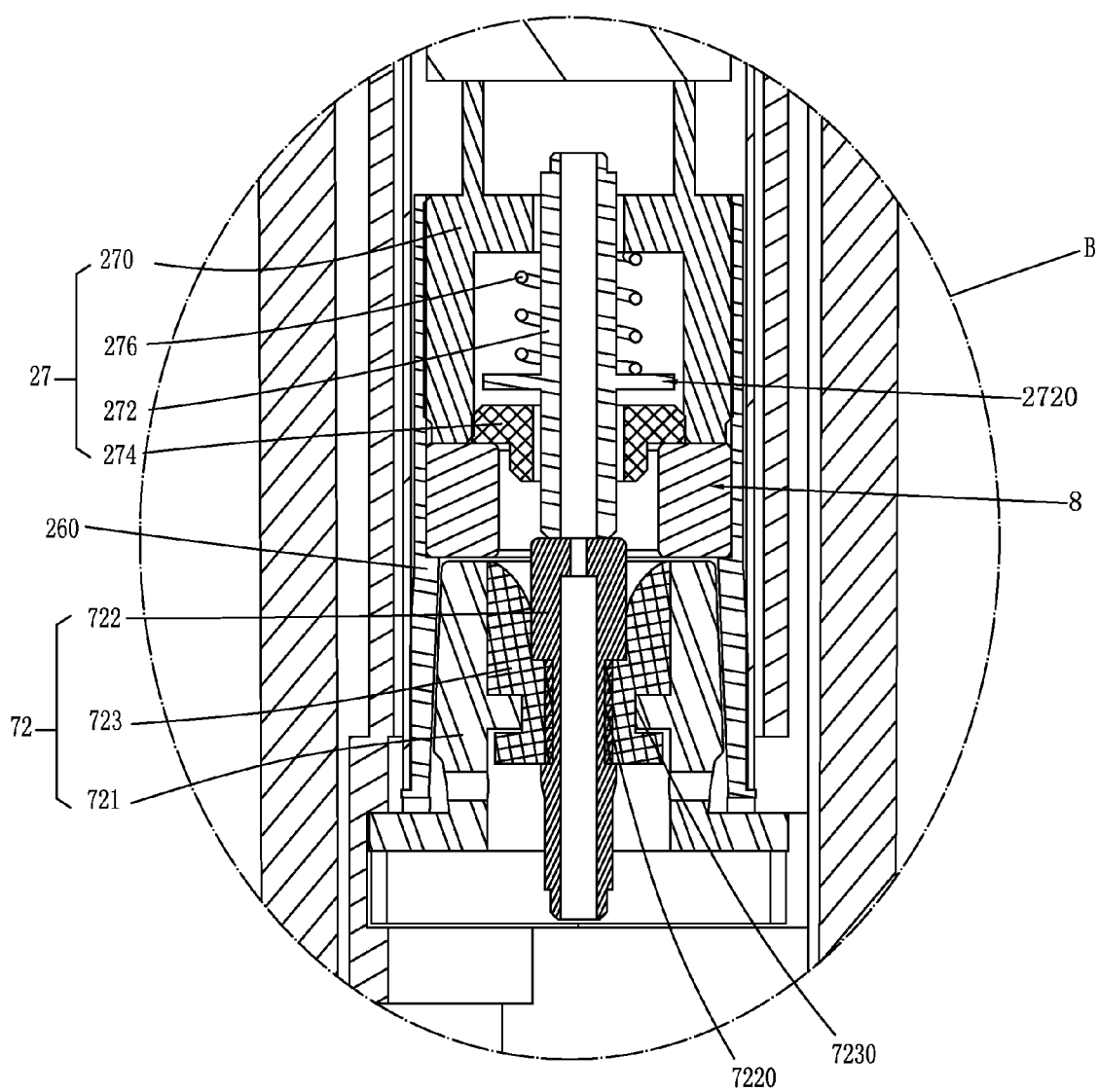
FIG. 8 is a partly-enlarged view of part B of FIG. 8.
Figure 9:
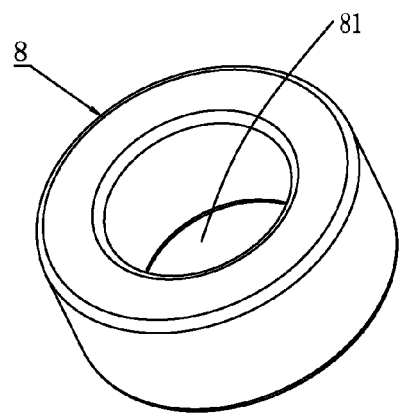
FIG. 9 is a perspective view of a permanent magnet of the electronic cigarette device in accordance with the embodiment of the invention.
Figure 10:
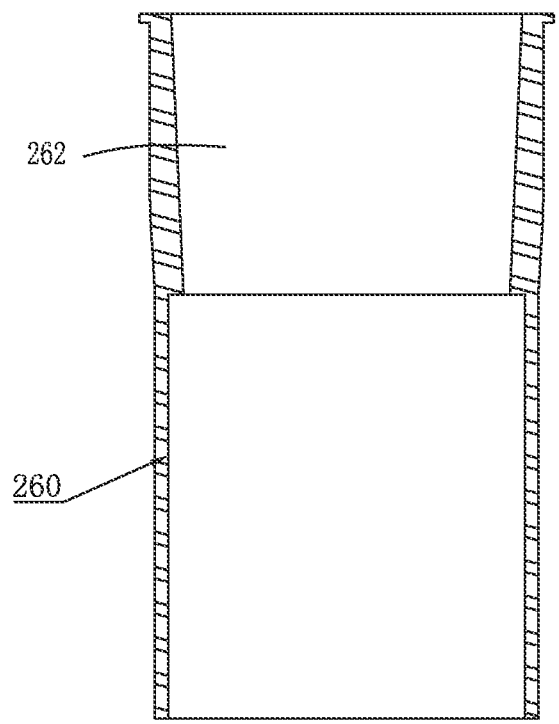
FIG. 10 is a cross-sectional view of a joint sleeve of a power shell of the electronic cigarette in accordance with the embodiment of the invention.

As shown in FIGS. 7-11, the power shell 26 is wholly shaped as a cylinder, and has a second battery 28 and a control circuit board 29 set therein. One end of the power shell 26 is set with a second connector 27 which is coupled to the first connector 72 of the power assembly 7. The second connector 27 comprises a second socket 270, a second pole 272 located in center of the second socket 270, and a second insulating bush 274 inserted between the second socket 270 and the second pole 272. The second socket 270 and the second pole 272 are electrically isolated by the second insulating bush 274, and the second socket 270 and the second pole 272 are respectively connected with either anode or cathode of the second battery 28 in the power shell 26. The second pole 272 is inserted in the second insolating bush 274, and has one end thereof extending outwards to contact with the corresponding pole of the outer connector. The second pole 272 forms a stop ring 2720 on its end section within the second socket 270, a spring 276 is fitted over the section of the second pole 272 in the second socket 270, and both ends of the spring 276 respectively abut against either the stop ring 2720 or the inner end wall of the second socket 270. The second pole 272 keeps extending outwards by virtue of the spring 276. The power shell 26 is set with a joint sleeve 260 as shown in FIG. 10 at its end with the second connector 27. The second connector 27 is disposed in an inner end of the joint sleeve 260, a taper hole 262 with a bigger front portion and a smaller rear portion is defined in an outer end of the joint sleeve 260, and the first socket 721 of the first connector 72 correspondingly has its front end configured as a cone with a smaller front portion and a bigger rear portion so as to be coupled to the taper hole 262 and inserted in the joint sleeve 260.

Figure 7:
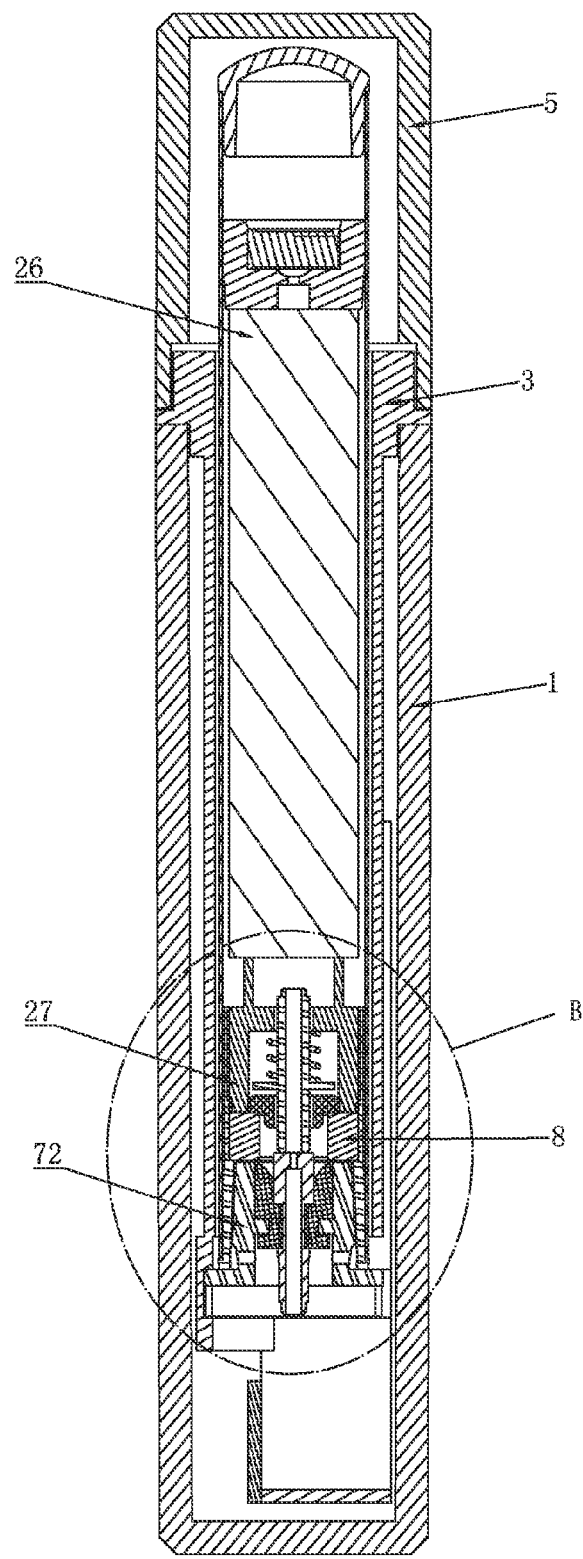
FIG. 7 is a cross-sectional view along line A-A in FIG. 1.

To obtain a better positioning and fixation when the second connector 27 of the power shell 26 is coupled to the first connector 72 of the power assembly 7, the socket 721 of the first connector 72 may be made from conductive magnet or magnetic materials, the magnetic material can be iron, and thus the socket 721 as a whole forms a first magnetic part. Otherwise, the first magnetic part is an independent structural member which is set on the first connector 72 and made from conductive magnet or magnetic materials. Accordingly, the second socket 270 can be made from conductive magnet or magnetic materials and thus the whole second socket 270 is configured as a second magnetic part; or the second connector is set with an independent structural member made from conductive magnet or magnetic materials as the second magnetic part. In accordance with the embodiment as shown in FIGS. 6 and 7, a magnetic ring 8 (as shown in FIG. 9) made from Ferro magnet or magnetic materials is independently designed as the second magnetic part. The magnetic ring 8 defines through-hole 81 for the second pole 272 passing therethrough. Therefore, an engagement between the first magnetic part and the second magnetic part may be a kind of engagement between magnet and magnet, between magnet and magnetic material, or between magnetic material and magnet.

As shown in FIGS. 7 and 8, when the power shell 26 is inserted into the second slot 31 of the frame 3 in its place, the second connector 27 is coupled to the first connector 72. Herein, the second socket 270 of the second connector 27 is coupled to the first socket 721 of the first connector 72; while the second pole 272 of the second connector 27 is propped by an end of the first pole 722 of the first connector 72, overcomes the resilience force of the spring 276 to slightly retract, and then tightly abuts on the first pole 722 under a force from the spring 276, which ensures a good contact between the first pole 722 and the second pole 272. Thereby, the circuit of the power assembly 7 correspondingly connects with the inner circuit of the power shell 26 so as to charge the second battery 28. Meanwhile, the first magnetic part and the second magnetic part attract each other to obtain a firm engagement between the power shell 26 and the first connector 72, which ensures a firm circuit connection during the battery charging. Furthermore, owing to positioning under the magnetic-adsorption principle, such operations to insert or pull out the power shell 26 become greatly simplified.

Figure 11:
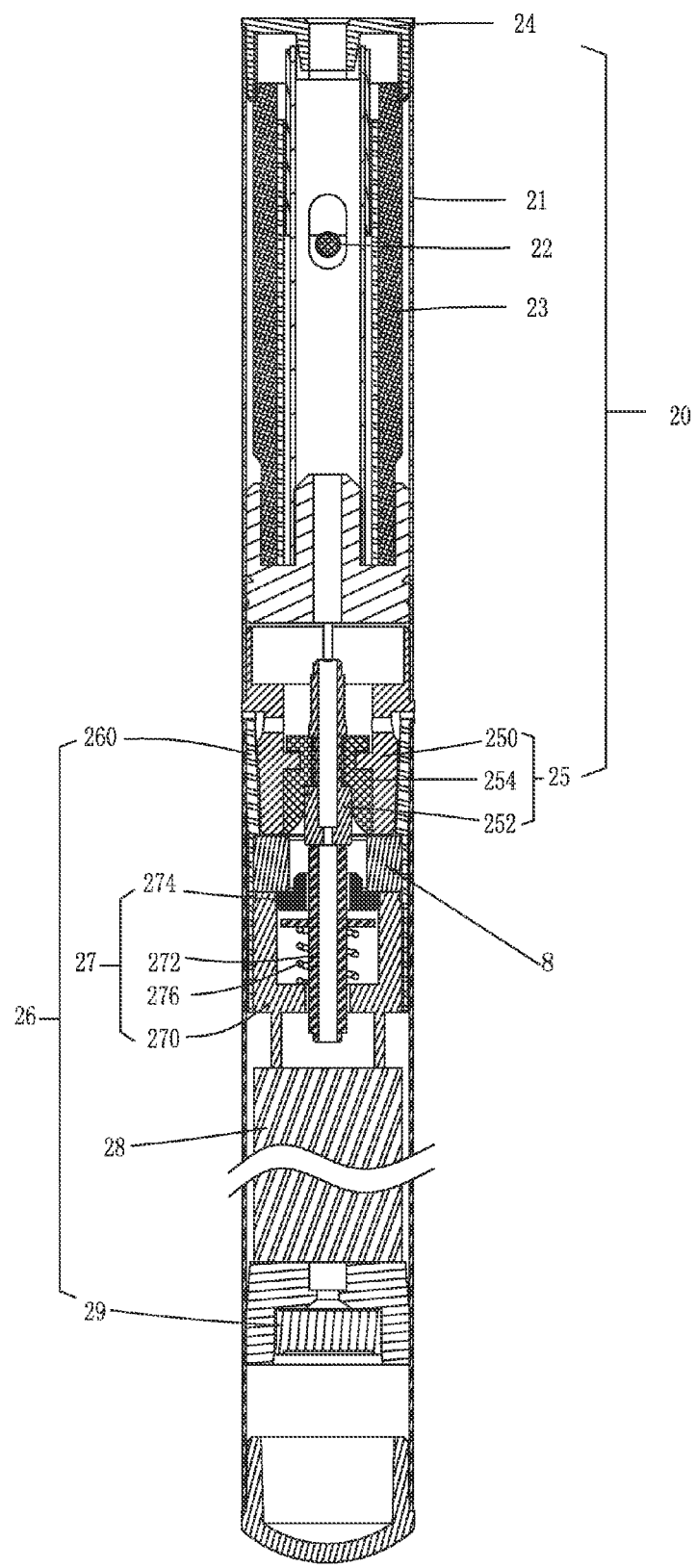
FIG. 11 is a cross-sectional view of the electronic cigarette in accordance with the embodiment of the invention.

As shown in FIG. 11, the inhaling shell 20 comprises an inhaling tube 21, an atomizer 22 and a tobacco-liquid cup 23 in the inhaling tube 21, a mouthpiece cover 24 disposed at one end of the inhaling tube 21, and a third connector 25 which is disposed at the other end of the inhaling tube 21 and is coupled to the second connector 27 of the power shell 26. The third connector 25 has a structure similar to the first connector 72 of the power assembly 7, and comprises a third socket 250, a third pole 252 and a third insulating bush 254. The third socket 250 and third pole 252 are insulated by the third insulating bush 254. The third socket 250 and the third pole 252 are respectively connected with either electrode of atomizer 22 in the inhaling shell 20, so that the second battery 28 can supply power to the atomizer 22 when the inhaling shell 20 is connected with the power shell 26.

As similar to the first connector 72, the third socket 250 of the third connector 25 can be made from conductive magnet or magnetic materials, so that the third socket 250 wholly constitutes the third magnetic part. Otherwise, the third connector 25 is set with an independent structural member as the third magnetic part which is made from conductive magnet or magnetic materials. According to such above design, when the inhaling shell 20 is connected with the power shell 26, the second socket 270 of the second connector 27 is engaged with the third socket 250 of the third connector 25, while the second pole 272 of the second connector 27 is pushed by an end of the third pole 252 of the third connector 25, overcomes the resilience force of the spring 276 to slightly retract, and then tightly abuts against the third pole 252 under the force from the spring 276. Thereby, the inner circuit of the power shell 26 is connected with the inner circuit of the inhaling shell 20 so that the second battery 28 in the power shell 26 can supply power to electrified components such as the atomizer in the inhaling shell. Meanwhile, the second magnetic part and the third magnetic part are absorbed each other so that connect the inhaling shell 20 is firmly engaged with the power shell 26, which ensures a steady circuit connection during use. Furthermore, positioning according to magnetic absorption principle greatly simplifies the operations to connect or disconnect the inhaling shell 20 with the power shell 26.

Appropriate modifications and amendments may be proposed according to the above embodiment of the invention, for instance, the first connector 72 and the second connector 27 can be interchanged with their positions; the inhaling shell 20 and the power shell 26 can be designed as one integral while the third connector 25 in the inhaling shell 20 is unnecessary, and the position of the second connector 27 in the power shell 26 can be properly adjusted so that the second connector 27 can be still engaged with the first connector 72 when the electronic cigarette 200 is placed in the electronic cigarette case 100.

The above description discloses the specific embodiments of the present invention. Note that those skilled in the art will appreciate multiple modifications and variations in light of the features of the present invention, and those modifications and variations shall be deemed within the scope of this invention.

What is claimed is:

1. An electronic cigarette device, comprising an electronic cigarette and an electronic cigarette case for accommodating the electronic cigarette, wherein the electronic cigarette case is set with a first magnetic part at a position thereof coupled to the electronic cigarette, and the electronic cigarette correspondingly has a second magnetic part to absorb the first magnetic part whereby the electronic cigarette and the electronic cigarette case are firmly engaged;

the electronic cigarette case has a first battery and a first connector at a position coupled to the electronic cigarette, the first connector comprises a first socket, a first pole disposed in center of the first socket, and a first insulating bush inserted between the first socket and the first pole so as to isolate the first socket from the first pole;

said electronic cigarette comprises an inhaling shell and a power shell; said power shell is wholly shaped as a cylinder; the power shell is set with a second battery therein, and one end of the power shell is set with a second connector which is connected with the second battery and is coupled to the first connector of the electronic cigarette case;

said second connector comprises a second socket, a second pole disposed in center of the second socket, and a second insulating bush inserted between the second socket and the second pole for insulating the second socket from the second pole; and said second socket and the second pole are respectively connected with either anode or cathode of the second battery inside the power shell; and said second pole is inserted in the second insulating bush, a stop ring is formed on a section of the second pole within the second socket, a spring is fitted on the section of the second pole within the second socket, and both ends of the spring respectively abut against the stop ring and an inner end wall of the second socket whereby the second pole keeps extending outwards.

2. The electronic cigarette device according to claim 1, wherein the first socket is made from conductive magnet or magnetic materials, and is configured as the first magnetic part; or the first connector is set with an independent structural member made from conductive magnet or magnetic materials as the first magnetic part.

3. The electronic cigarette device according to claim 1, wherein said electronic cigarette case comprises a main body with an open top, a frame inside the main body for accommodating the electronic cigarette, a cover movably engaged on the open top of the main body, and a power assembly set on the frame.

4. The electronic cigarette device according to claim 3, wherein said power assembly comprises the first connector, the first battery disposed in a battery groove at a bottom of the frame, a power port extending to an outer wall of the main body and connected with the first battery, and a printed circuit board (PCB with a power charging control circuit therein and connected with the first battery; the first socket and the first pole of the first connector are electrically connected with the PCB by wires; and the first connector, the first battery and the power port are all integrated on the PCB.

5. The electronic cigarette device according to claim 1, wherein said second socket is made from conductive magnet or magnetic materials and is configured as the second magnetic part; or the second connector is set with an independent structural member made from conductive magnet or magnetic materials as the second magnetic part.

6. The electronic cigarette device according to claim 1, wherein said power shell has a joint sleeve at its end with the second connector, the second connector is disposed in an inner end of the joint sleeve, while the joint sleeve in its outer end defines a taper hole with a bigger front portion and a smaller rear portion, and the first socket of the first connector correspondingly has its front end configured as a cone with a smaller front portion and a bigger rear portion.

7. The electronic cigarette device according to claim 5, wherein said inhaling shell and the power shell is detachably connected; said inhaling shell comprises an inhaling tube, an atomizer and a tobacco-liquid cup disposed in the inhaling tube, a mouthpiece cover disposed at one end of the inhaling tube, and a third connector disposed at the other end of the inhaling tube for being coupled to the second connector of the power shell; said third connector comprises a third socket, a third pole and a third insulating bush which is inserted between the third socket and the third pole for separating the third socket from the third pole; and the third socket and the third pole are respectively connected with either electrode of the atomizer in the inhaling shell.

8. The electronic cigarette device according to claim 7, wherein said third socket of the third connector is made from conductive magnet or magnetic materials and thereby is configured as a third magnetic part, or the third connector is set with an independent structural member as the third magnetic part which is made from conductive magnet or magnetic materials; and the third magnetic part magnetically absorbs the third magnetic part of the power shell.

9. The electronic cigarette device according to claim 3, wherein said inhaling shell and the power shell are detachably connected; and the frame at its top end defines a first slot and second slot for respectively accommodating the inhaling shell and the power shell of the electronic cigarette.

10. The electronic cigarette device according to claim 9, wherein said frame defines a retaining nest aligned to a bottom of the second slot, the first socket of the first connector forms a flange ring round its outer wall, and the first connector is mounted in the retaining nest in the frame by virtue of the flange ring.

11. The electronic cigarette device according to claim 9, wherein said frame defines a tensioning groove at a center of the first slot and crossing the first slots, a tensioner made from elastic material is mounted in the tensioning groove, and the tensioner defines a through-hole which is aligned to the first slot and has a slightly-smaller diameter than an outer diameter of the inhaling shell so as to fasten the inhaling shell therein.

12. An electronic cigarette device, comprising an electronic cigarette and an electronic cigarette case for accommodating the electronic cigarette, wherein the electronic cigarette case is set with a first magnetic part at a position thereof coupled to the electronic cigarette, and the electronic cigarette correspondingly has a second magnetic part to absorb the first magnetic part whereby the electronic cigarette and the electronic cigarette case are firmly engaged;
  the electronic cigarette case has a first connector at a position coupled to the electronic cigarette;
  said electronic cigarette comprises a battery therein, and a second connector which is connected with the battery and is coupled to the first connector of the electronic cigarette case;
  said second connector comprises a socket, a pole disposed in the socket, and an insulating bush inserted between the socket and the pole for insulating the socket from the pole, and said socket and the pole are respectively electrically connected with either anode or cathode of the battery of the electronic cigarette; and
  a stop ring is formed on a section of the pole within the socket, a spring is fitted on the section of the pole within the socket, and both ends of the spring respectively abut against the stop ring and an inner wall of the socket whereby the pole keeps extending outwards.

13. An electronic cigarette device, comprising an electronic cigarette and an electronic cigarette case for accommodating the electronic cigarette;
  wherein the electronic cigarette case has a first connector at a position electrically coupled to the electronic cigarette;
  said electronic cigarette comprises a power shell, the power shell is set with a battery therein, and one end of the power shell is set with a second connector which is electrically connected with the battery and is electrically coupled to the first connector of the electronic cigarette case;
  said second connector comprises a socket, a pole disposed in the socket, and an insulating bush inserted therebetween;
  said pole is inserted in the insulating bush, a stop ring is formed on a section of the pole within the socket, a spring is fitted on the section of the pole within the socket, and both ends of the spring respectively abut against the stop ring and an inner end wall of the socket whereby the pole keeps extending outwards; and
  the pole of the second connector is resiliently and electrically engaged with the first connector of the electronic cigarette case whereby the electronic cigarette case can charge the battery in the electronic cigarette.

14. The electronic cigarette device according to claim 13, wherein the electronic cigarette and the electronic cigarette case are magnetically engaged.

15. The electronic cigarette device according to claim 14, wherein an engagement between the electronic cigarette and the electronic cigarette case is a kind of engagement between magnet and magnet, between magnet and magnetic material, or between magnetic material and magnet.

* * * * *